(12) United States Patent
Canpolat et al.

(10) Patent No.: US 11,683,683 B2
(45) Date of Patent: *Jun. 20, 2023

(54) TECHNIQUES FOR ESTABLISHING ACCESS TO A LOCAL WIRELESS NETWORK

(71) Applicant: INTEL CORPORATION, Santa Clara, CA (US)

(72) Inventors: Necati Canpolat, Beaverton, OR (US); Vivek Gupta, San Jose, CA (US)

(73) Assignee: INTEL CORPORATION, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/856,531

(22) Filed: Jul. 1, 2022

(65) Prior Publication Data
US 2022/0338009 A1 Oct. 20, 2022

Related U.S. Application Data

(63) Continuation of application No. 15/957,493, filed on Apr. 19, 2018, now Pat. No. 11,412,381, which is a continuation of application No. 14/129,947, filed as application No. PCT/US2013/061309 on Sep. 24, 2013, now abandoned.

(60) Provisional application No. 61/771,112, filed on Mar. 1, 2013.

(51) Int. Cl.
H04W 12/065 (2021.01)
H04W 12/069 (2021.01)
H04W 48/18 (2009.01)
H04W 84/12 (2009.01)

(52) U.S. Cl.
CPC ....... *H04W 12/065* (2021.01); *H04W 12/069* (2021.01); *H04W 48/18* (2013.01); *H04W 84/12* (2013.01)

(58) Field of Classification Search
CPC ............. H04W 12/06; H04W 12/0431; H04W 12/069; H04W 12/08; H04W 8/20; H04L 63/0823; H04L 63/062; G06F 21/33
See application file for complete search history.

(56) References Cited

U.S. PATENT DOCUMENTS

| 6,760,409 B1* | 7/2004 | Lipton ................. H04Q 3/0029 379/93.12 |
| 8,806,587 B2* | 8/2014 | Frelechoux ........... H04L 63/166 726/5 |
| 9,161,219 B2* | 10/2015 | Bryksa .................... G06Q 10/02 |
| 9,307,408 B2* | 4/2016 | Gupta ................. H04L 63/0823 |
| 9,571,482 B2* | 2/2017 | Gupta ................... H04L 63/164 |
| 2004/0111600 A1* | 6/2004 | Kaler .................... H04L 9/0891 713/150 |
| 2006/0173844 A1* | 8/2006 | Zhang ................... H04L 63/083 707/999.009 |

(Continued)

*Primary Examiner* — Lizbeth Torres-Diaz
(74) *Attorney, Agent, or Firm* — KDW Firm PLLC

(57) ABSTRACT

An apparatus includes a memory to store subscription data for access to a network, the subscription data including at least terms and conditions information for the network; circuitry linked to the memory; and a connection component for execution on the circuitry to identify an access point connected to the network and automatically forward at least a portion of the subscription data to the identified access point in an association message. Other embodiments are disclosed and claimed.

25 Claims, 10 Drawing Sheets

(56) References Cited

U.S. PATENT DOCUMENTS

| | | | |
|---|---|---|---|
| 2007/0086372 A1* | 4/2007 | Lee | H04N 21/8355 370/328 |
| 2007/0180499 A1* | 8/2007 | Van Bemmel | H04L 63/0892 726/4 |
| 2008/0127320 A1* | 5/2008 | De Lutiis | H04L 61/5084 726/9 |
| 2011/0154454 A1* | 6/2011 | Frelechoux | H04L 63/0892 726/5 |
| 2011/0264730 A1* | 10/2011 | Dattagupta | H04L 12/2809 709/203 |
| 2012/0203824 A1* | 8/2012 | Oommen | H04L 41/0809 709/217 |
| 2012/0210404 A1* | 8/2012 | Patil | H04L 41/0293 726/6 |
| 2013/0024921 A1* | 1/2013 | Gupta | H04L 41/0806 726/6 |
| 2013/0217359 A1* | 8/2013 | Cherian | H04L 63/062 455/411 |
| 2014/0185597 A1* | 7/2014 | Gupta | H04L 63/108 370/338 |
| 2015/0074768 A1* | 3/2015 | Levi | H04L 61/50 726/4 |
| 2016/0174065 A1* | 6/2016 | Li | H04W 12/00 455/419 |
| 2016/0197928 A1* | 7/2016 | Patil | H04L 63/0823 726/6 |
| 2016/0374134 A1* | 12/2016 | Kweon | H04W 12/06 |
| 2019/0098556 A1* | 3/2019 | Johnson | H04W 48/02 |
| 2020/0053546 A1* | 2/2020 | Panchal | H04W 8/082 |

\* cited by examiner

TECHNIQUES FOR ESTABLISHING ACCESS TO A LOCAL WIRELESS NETWORK

RELATED CASES

This application is a continuation of, claims the benefit of and priority to previously filed U.S. patent application Ser. No. 15/957,493 filed Apr. 19, 2018, which is a continuation of, claims the benefit of and priority to previously filed U.S. patent application Ser. No. 14/129,947 filed Dec. 28, 2013, which is a U.S. National Phase Entry for PCT/US2013/061309 filed Sep. 24, 2013, which claims the benefit of U.S. provisional patent application No. 61/771,112 filed Mar. 1, 2013; all of which is hereby incorporated by reference in their entirety.

BACKGROUND

Communications infrastructure for wireless local area networks (WLAN), such as those operating under the Institute of Electrical and Electronics Engineers (IEEE) 802.11 series of standards (collectively referred to as "Wi-Fi"), continues to evolve to meet changing user needs. In general, an association process for a user to find and connect to a correct Wi-Fi network may require excessive time and complications for most users. Further, Wi-Fi networks do not provide a convenient mechanism to assume work requests from overloaded wireless wide area networks (WWAN), such as overloaded 3G and 4G cellular radiotelephone networks. Recent efforts to address some of these issues have led to development of a series of standards to simplify connection and roaming in Wi-Fi based networks.

These standards are sometimes collectively referred to informally as "Hotspot" standards. In particular, a Hotspot standard represents evolution of Wi-Fi infrastructure supported by the Wi-Fi Alliance® and is designed to interoperate with the IEEE 802.11 standards for WLAN communications. Some goals of the Hotspot standards include enabling simple, secure connection to Wi-Fi hotspots, facilitating easy roaming among them, and managing traffic offload from 3G/4G networks to Hotspot-enabled Wi-Fi networks. As part of this effort, network operators are presently deploying a large number of Wi-Fi hotspots to address the growing data demand, provide better quality of experience, and reduce churn.

Several issues currently exist with free Wi-Fi public hotspots (FPHs). For instance, FPHs typically provide open network connection without any security. Another issue is that users typically have to go thru multiple manual steps each time they connect to FPHs.

DETAILED DESCRIPTION

In the following description, numerous specific details are set forth. However, it is understood that embodiments may be practiced without these specific details. In other instances, well-known methods, structures and techniques have not been shown in detail in order not to obscure an understanding of this description.

References to "one embodiment," "an embodiment," "example embodiment," "various embodiments," etc., indicate that the embodiment(s) so described may include a particular feature, structure, or characteristic, but not every embodiment necessarily includes the particular feature, structure, or characteristic. Further, repeated use of the phrase "in one embodiment" does not necessarily refer to the same embodiment, although it may.

As used herein, unless otherwise specified the use of the ordinal adjectives "first," "second," "third," etc., to describe a common object, merely indicate that different instances of like objects are being referred to, and are not intended to imply that the objects so described must be in a given sequence, either temporally, spatially, in ranking, or in any other manner Embodiments build on a currently evolving Wi-Fi technology, such as the Wi-Fi Alliance® Technical Committee Hotspot 2.0 Technical Task Group Hotspot 2.0 (Release 2) Technical Specification, Version 3.08, dated Jul. 30, 2013 ("Hotspot 2.0 Standard"), and its predecessors, progeny and variants Hotspot 2.0. Embodiments allow secure and seamless connection to Wi-Fi hotspots and provisioning of operator policy and credentials on mobile devices that will support offloading of cellular data to Wi-Fi.

Free Wi-Fi public hotspots are globally available in many convenient locations such as airports, shopping centers, coffee shops etc. However, there are several issues to be addressed as applied to free Wi-Fi public hotspots (FPHs). One such issue is that free Wi-Fi public hotspots provide open network connection without any security. Someone within the coverage area of a FPH can easily snoop on the clear (unencrypted) traffic to determine whatever a mobile device user of the FPH transmits and receives to/from the mobile device. This raises security/privacy concerns in the network service provider industry. Also, this deters some users from using free public Wi-Fi hotspots.

Figure 1:
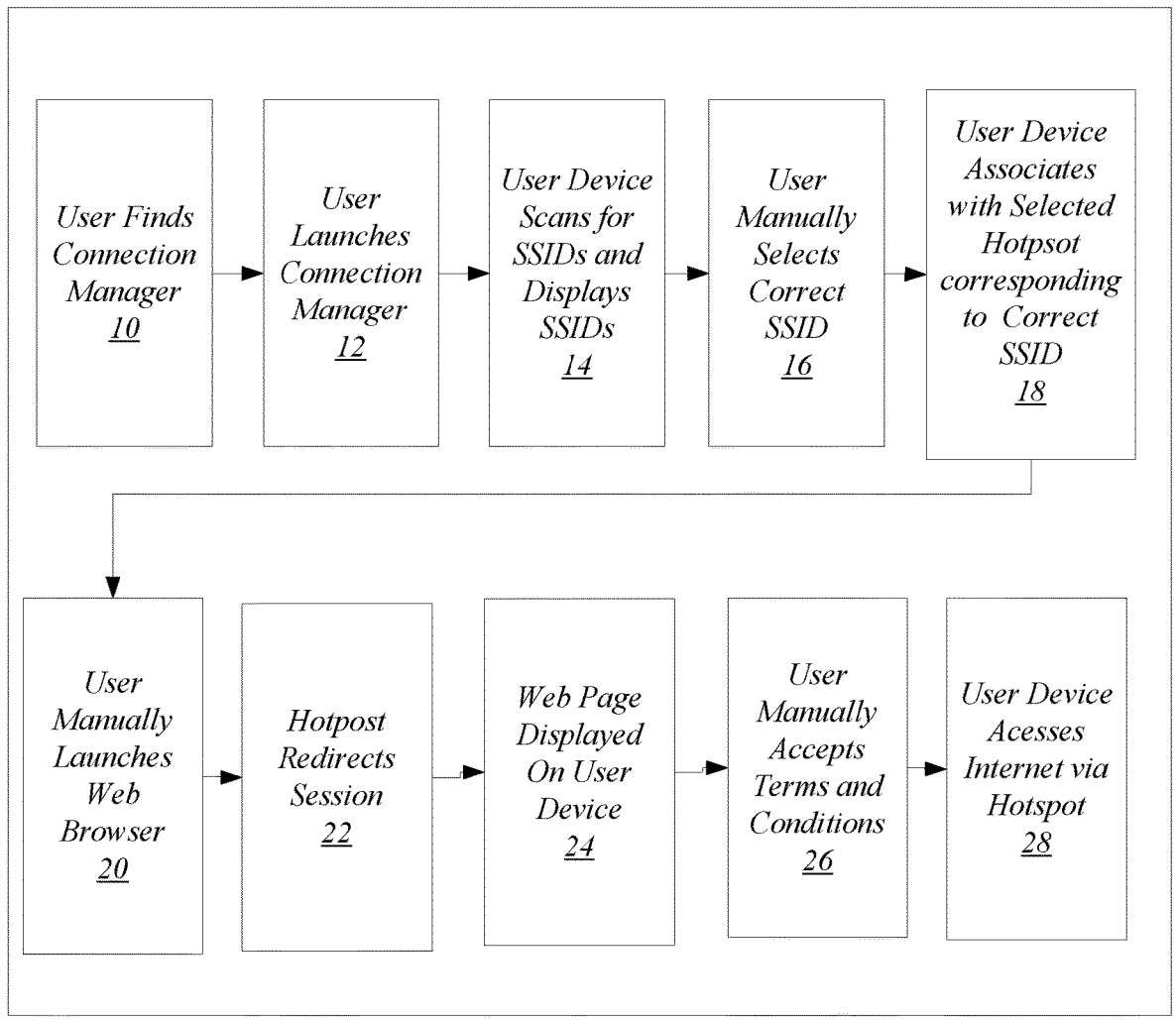
FIG. 1 depicts current operations for establishing connection to an access point.

Another such issue is that, often, when users connect to free Wi-Fi public hotspots, they have to go thru multiple manual steps each time they connect to them. An example of this is shown in FIG. 1. At block 10 a user finds a connection manager of a user device. At block 12 the user launches the connection manager At block 14 the user device scans for SSIDs that identify access points within a radio communications range of the user device. At block 16, the user manually selects a correct SSID corresponding to an access point for a network for which the user wishes to connect. At block 18, the user device associates with a selected access point (also referred to as "hotspot" herein) corresponding to the correct SSID. At block 20 the user manually launches a web browser on the user device. At block 22 a redirection is received on the user device to a host network (service provider network). At block 24 a web page corresponding to the service provider network. At block 26 a user manually accepts terms and conditions used to grant access to the service provider network. At block 28, the user device accesses the Internet via the selected hotspot.

Such operations as outlined are inconvenient and cumbersome, and deter users from using free public Wi-Fi hotspots. However, hotspot providers may be required to display the "terms and conditions" (T&C) page to their users for legal reasons. Moreover, users often have to carry out the above steps even though a user may have previously accepted the same T&C that are being displayed.

In the discussion to follow various examples of terms and conditions (T&C) provisioning and user credential provisioning, as well as remediation are detailed that are consistent with the present embodiments. The set of information referred to herein as "terms and conditions," include the legal rules of operation of an entity, such rules for hotspot operation that are provided by hotspot operators. Embodiments provide a mechanism for over the air provisioning of free public access credential information, a Terms and Conditions tracking mechanism, and securing the connection to a free public hotspot using WiFi protected access security II (WPA2). This enables mobile devices to automatically discover the free public hotspots and connect to them without user intervention after the provisioning process is completed on the mobile device.

As indicated above, free Wi-Fi public hotspots are currently available globally, but they require users' manual involvement in multiple steps and they create poor user experiences, as shown in FIG. 1. Also, they operate as open networks in which all the traffic is sent in clear text without encryption. This may cause security/privacy concerns, for example, by exposing users to nearby "snoopers."

The free Wi-Fi public hotspot provisioning is the process by which a mobile device registers with a provider associated with a free public hotspot ("free public hotspot provider"). The terms "free hotspot," "free WiFi public hotspot" and "free public hotspot" are used herein to indicate an access point or set of access points that provide wireless access to a wired or wireless network such as the Internet without charge. The provisioning enables a user to read terms and conditions, accept the terms and conditions, and obtain a username/password with which to have network access. The mobile device is then provisioned with the credentials necessary to securely connect to free public Wi-Fi networks on its follow up access to the network.

Embodiments provide an end-to-end architecture for over-the-air (via wireless communications) provisioning of mobile devices with free Wi-Fi public access credentials information. The embodiments enable automatic and secure connection of mobile devices to free Wi-Fi public hotspots. The free Wi-Fi public hotspots may be hosted by a service provider (SP) that supports a network such as a free private network or free public network, also referred to as a "free Wi-Fi public network," that provides access to resources such as the Internet from one or more free Wi-Fi public hotspots.

Figure 2B:
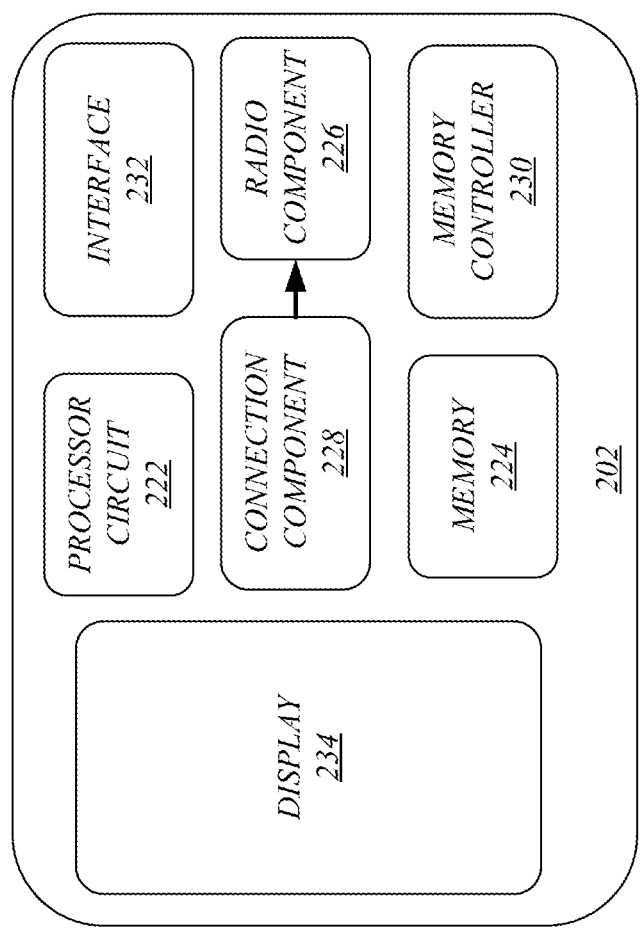
FIG. 2B depicts an embodiment of a mobile device.
Figure 2A:
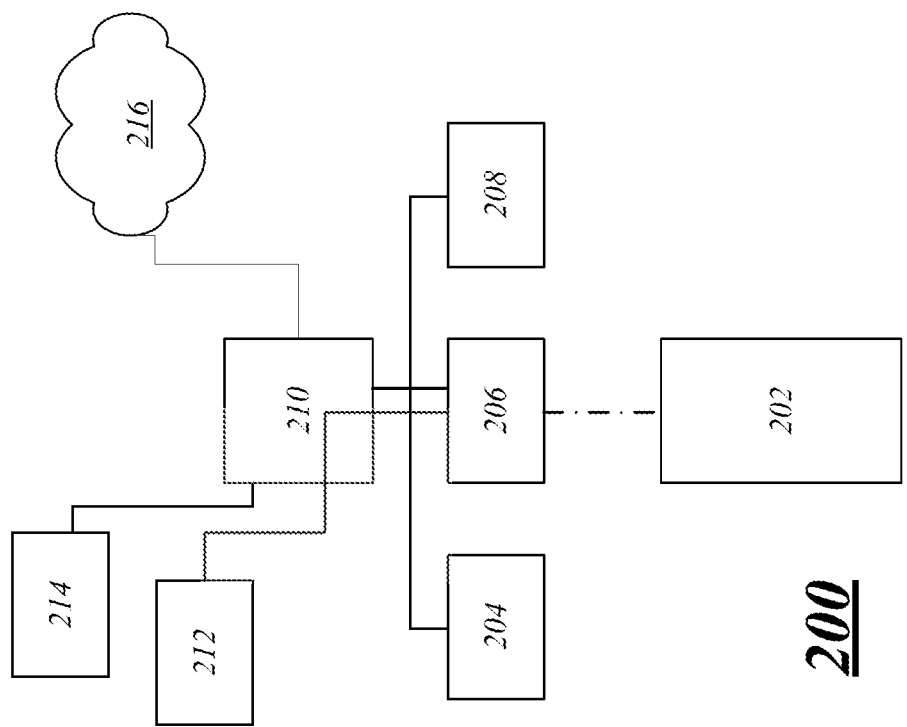
FIG. 2A depicts an exemplary architecture consistent with the present embodiments.

An exemplary end-to-end reference architecture is shown in FIG. 2A.

FIG. 2A is a diagram showing an embodiment of an architecture 200 combining a FHS (Free Hotspot; the term free public hotspot (FPH) is used interchangeably with FHS herein) client or mobile device 202, FHS access points (AP) 204, 206, and 208, a "terms and conditions" server (T&C Server) 212, Authentication, Authorization and Accounting (AAA) server 214, Internet 216, and WLAN access controller/router 210. In various embodiments the free Wi-Fi public hotspot architecture 200 shown in FIG. 2A, and in particular the arrangement of the various components 202-216, is composed of the following logical entities:

Hotspot (HS) 2.0 Access Points with free Wi-Fi Hotspot access enabled
WLAN Access Controller
An HS 2.0 Enabled Terms and Conditions HTTP Server
An AAA Server
Internet Access
An HS 2.0 enabled Mobile Device Exemplary features and operation of each of these entities are outlined below.

HS 2.0 Terms and Conditions (T&C) Server:

Consistent with various embodiments, a server associated with a hotspot, referred herein to as a T&C server 212, is provisioned to operate in accordance with procedures outlined in the Hotspot 2.0 Standard. The T&C Server 212 may be used to register new users and provision the user's device with credentials. The T&C Server 212 can also be used to remediate provisioning of devices. An access network query protocol (ANQP) FHS T&C provider element informs the mobile device how to contact this server.

In particular embodiments, the T&C server 212 is configured with a Terms and Conditions Page and supports versioning of T&C information. The T&C server 212 may further verify information submitted by the mobile device 202. The T&C server 212 may inform the WLAN AC 210 if a verification process conducted with the mobile device 202 was a success. The T&C server 212 may further send a notification message for remediation to the mobile device 202 in order to perform a remediation process when it identifies T&C that are different from what the mobile device 202 has submitted. The T&C server 212 may send T&C information to be provisioned into the mobile device 202.

Hotspot (HS) 2.0 Access Points with Free Wi-Fi Hotspot Access Enabled

In various embodiments the hotspot access point architecture includes one or more access points that are Hotspot 2.0 access points enabled to facilitate free Wi-Fi public hotspot access. The access point may advertise in its beacon that it is a Hotspot 2.0 AP indicating it is a free Wi-Fi public hotspot access and also supports provisioning of the FPH. Thus, the access points 204-208 may be configured to transmit a beacon that indicates that the given access point provides free public Hotspot 2.0 access by setting the Network Type in the 802.11u (IEEE, Standard for Information Technology-Telecommunications and information exchange between systems-Local and Metropolitan networks-specific requirements-Part II: Wireless LAN Medium Access Control (MAC) and Physical Layer (PHY) specifications: Amendment 9: Interworking with External Networks, 2011) information element Network Type to Free Public Access and dual SSIDs—one for provisioning and one for free public Hotspot 2.0 access. The AP may further relay any provisioning requests and responses from/to a mobile device 202 and the T&C server 212 and AAA server 214.

AAA Server:

The AAA Server 214 may authenticate mobile devices such as mobile device 202 for network access using credentials that are obtained from the T&C Server 212.

Hotspot 2.0 Free Wi-Fi Public Hotspot Enabled Client (e.g., Executing on Mobile Device 202).

Consistent with various embodiments, the mobile device 202 may support discovery of free Wi-Fi public hotspots using scan and probe requests. The mobile device 202 may further prompt a user to indicate whether the user wishes to have auto-connection enabled for a given FPH. The mobile device 202 may further perform provisioning of FPH credentials/information on the mobile device 202. The mobile device 202 may also identify if it has any provisioned information for the specific free Wi-Fi public hotspot in question. After initially obtaining and storing such provisioned information while in communication with a FPH, on subsequent occasions when the mobile device202 connects to the FPH, the mobile device 202 may automatically pass the provisioned information for the specific FPH. In addition, the mobile device 202 may automatically perform secure authentication to a network provided by the FPH.

The mobile device 202 may further perform a remediation processing when credential information for the given FPH has expired or the terms and conditions information for access to a network has changed since the user of the mobile device last performed an acceptance of terms and conditions. A subscription remediation functionality that is located within T&C server 212 may be used to provide the user with new T&C to be accepted and to correct problems with the user's credentials that are known to a service provider. The mobile device 202 may further perform specific tasks such as launching a web browser and displaying a provider's advertisement page to the user.

FIG. 2B depicts details of an embodiment of the mobile device 202. As illustrated, the mobile device 202 includes a memory 224, processor circuit 222, radio component 226, and connection component 228. The memory 224 may store information such as subscription data for a provider of FPHs. Such subscription data may include terms and conditions information and user credentials that are provided to the mobile device 202 by a free public hotspot provider, as detailed in the figures to follow. The radio component 226 may transmit and receive information via a WiFi connection including a connection to an access point of an FPH. The mobile device 202 may also include a memory controller 230 to direct read and write operations to the memory, an interface 232 to exchange data with the identified access point and a display 234 to present the subscription data to a user of the mobile device 202.

The connection component 228 may perform various operations including any or all of the operations of a mobile device detailed with respect to the figures to follow. For example, the connection component 228 may store terms and conditions information and user credentials in memory 224 when the mobile device 202 registers with a provider of an FPH, may update terms and conditions information and user credentials on the mobile device 202, and may facilitate auto-connection with the Internet via a provider of a FPH using terms and conditions information and user credentials stored in memory 224. The terms "auto-connect" and "auto-connection" as used herein refer to procedures in which a mobile device may establish connection to an entity such as a hotspot or Internet without intervention of a device user in the process.

The connection component 228 may comprise various hardware elements, software elements, or a combination of both. Examples of hardware elements may include devices, components, processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

WLAN Access Controller/Router:

Networks often impose access restrictions on an AP used in a public hotspot, which restricts the mobile devices connectivity to the T&C servers during a T&C and credential provisioning process. This is done to protect the network and prevent a user from obtaining Internet access. However, these access restrictions are arranged to not prevent the mobile device from contacting a Subscription server. In various embodiments, the WLAN access controller/router 210 may accordingly block an Internet access port until T&C verification and authentication steps are successfully completed by the mobile device 202. The WLAN access controller/router 210 only allows traffic to T&C server 212 and AAA server 214 in the network during this verification and authentication period. The WLAN access controller/router 210 may also enable access to the Internet for properly authenticated devices, such as mobile device 202.

Consistent with various embodiments, the T&C server 212 may generate T&C metadata and subscription credentials. This information may include username/password, phone number of user, email of user, certificates that can identify the user. In some embodiments, credentials may be generated specific to a user so that each user can be identified. In other embodiments, a FPH may issue a single credential to all of its users without identifying specific users. The determination as to whether to generate user specific credentials may be made in some instances by the hotspots providers or according to regulatory rules specific to a given country. T&C provisioning information may include the T&C version for which a user has agreed, its date and other relevant information. For example, when a mobile device connects to a FPH the free public hotspot provider may display its advertisement page to the user via the mobile device 202.

In various embodiments, T&C server 212, AAA server 214 and access controller/router 210 functionalities/devices can be co-located in a single device or may be separately located in different devices. In one embodiment, T&C server 212, AAA server 214 and access controller/router 210 functionalities may be combined into a single "fat" AP, that is, an AP with sufficient program logic and processing power to allow it to enforce policies relating to access and usage, rather than working under the supervision of a centralized controller. According to various embodiments, the communication between T&C server 212, AAA server 214 and access controller/router 210 are implementation and deployment specific. In each of these configurations, the communication between such entities may be secure, that is, the entities are authenticated and communication between them is confidentiality-protected and integrity-protected.

The first time a mobile device encounters a free public hotspot (FPH) in which acceptance of T&Cs is a prerequisite for network access, the user is notified that acceptance is required. Once the user has accepted the T&Cs, the mobile device and hotspot infrastructure cooperate as described in the following examples to autonomously facilitate network access as long as the terms and conditions have not been modified since they were previously accepted.

Consistent with various embodiments, a Wi-Fi access network may be considered a "free public Wi-Fi network" (alternatively described as "free, public Wi-Fi network") "when the access network type field in the Interworking element is set to the value for "free, public Wi-Fi network." The messages defined in the following sections are available for use by Hotspot 2.0-compliant mobile devices when the following conditions are true:

The Hotspot is Hotspot 2.0-compliant
The Hotspot is a free, public Wi-Fi network.
The Hotspot is robust secure network (RSN) enabled.
The Network Authentication Type ANQP message indicates that acceptance of terms and conditions are required.

Free Hotspot 2.0 compliant public Wi-Fi networks are typically configured to use WPA2-Enterprise (WPA2 version using dynamic encryption keys) security. It is to be noted that in different embodiments, authentication may include determination of user identity while in other embodiments, anonymous authentication may be performed. Some regulatory domains require free, public Wi-Fi networks to authenticate a user's identity. In some embodiments free, public Wi-Fi networks that operate in regulatory domains not requiring the user's identity be disclosed may use WPA2-Enterprise security with anonymous authentication, or may use a generic username/password provided for all users of the FPH or a specific username/password assigned to each user of the FPH.

Figure 3:
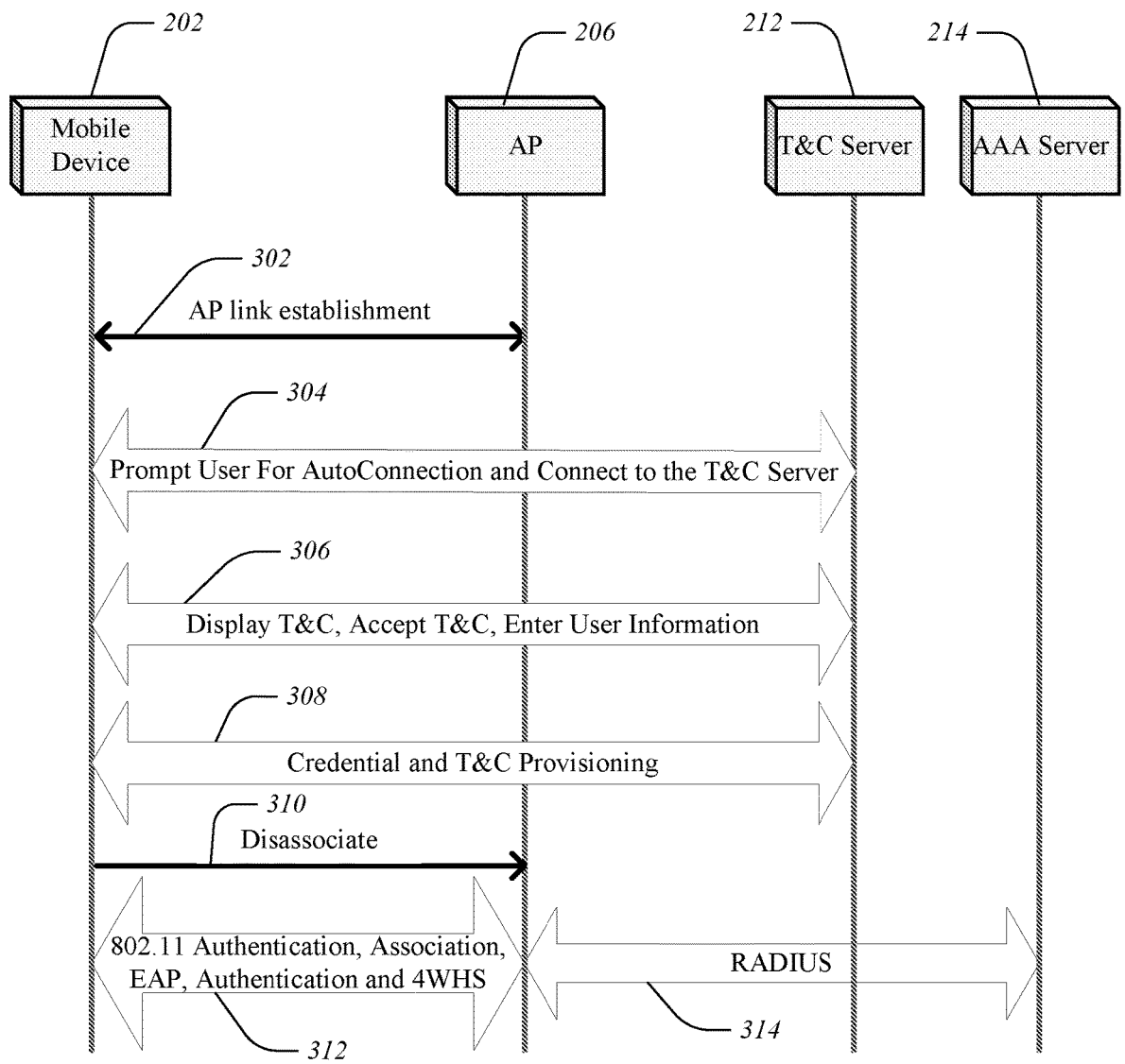
FIG. 3 depicts exemplary operations of an embodiment.

One embodiment of the T&C and credential provisioning message exchange is shown in FIG. 3. This message exchange includes a series of messages and operations, as described below.

A mobile device, such as mobile device 202 initiates a credential and T&C provisioning process by associating to the Wi-Fi access network. The mobile device 202 may execute several operations needed to connect to the user-selected FPH, which are shown collectively as operation 302, and may be conducted between the mobile device 202 and access point 206. Details for this operation are provided further below.

In operation 304, when the mobile device 202 identifies that a FHS supports provisioning of T&C and credentials, the mobile device 202 may prompt the user to determine if the user wants to enable auto connection to this FHS. In some cases a FHS provider may require user information such as user name, phone number, PIN code etc., to meet regulatory requirements. When the user is prompted for auto connection, the user may select "yes."

In operation 306, the mobile device 202 receives the T&C and user input/registration information from the T&C server 212 and displays it to the user using a browser or building connection manager capability. The user provides requested registration information such as username/password, phone number or PIN code etc., if required, and accepts the T&C.

When a user completes registration, the T&C Server 212 updates the user database using a mechanism that may be implementation specific. In operation 308, the T&C server 212 then sends an update request to AAA server 214 with user credentials for mobile device 202. At the end of the user registration processing, the T&C server 212 informs the mobile device 202 that the message exchange is complete. The T&C server 212 also provides T&C metadata and credentials to the mobile device 202, which mobile device 202 may then provision (store) on the mobile device 202.

In operation 310 the mobile device 202 dissociates from the FPH network associated with T&C server 212.

In a subsequent operation 312, the mobile device 202 associates again to the FPH network coupled to the T&C server 212 using the newly provisioned credentials that are stored on the mobile device 202. The operation 314 for authentication may employ Remote Access Dial In User Service (RADIUS) which is a networking communications protocol that provides centralized Authentication, Authorization, and Accounting management for computers that connect and use a network service. The user is then granted access to Internet.

In different embodiments, FHS provisioning detailed above can be implemented using either open mobile alliance device management (OMA DM) or simple object access protocol-extensible markup language (SOAP-XML) protocols, which provide the transport mechanism. T&C and credential data is transported within the PerProviderSubscription management object (MO). This PerProviderSubscription MO is used regardless of whether the transfer protocol is OMA DM or SOAP-XML. It is implementation- and deployment-specific if OMA-DM or SOAP-XML is used. However, in the present embodiments the provisioning process may be implemented in either protocol. When SOAP-XML is used, the messages carry an HTTP content type of "application/soap+xml." Thus, in specific embodiments, the messages are delivered to the SOAP processing application in both the mobile device 202 and T&C server 212. When used with OMA-DM, DM messages can contain the XML content.

It is to be noted than in addition to provisioning user name/password credentials to facilitate automatic connection to a network, in other embodiments security certificates may be used instead of user name/password information. Moreover, in some implementation, a trust model of the Hotspot 2.0 online signup solution may be enabled, such that a provider of the FPH may deploy the trust model with FHS provisioning. In still other embodiments, network providers may only implement T&C provisioning and may not support user name/password provisioning per user.

Figure 4:
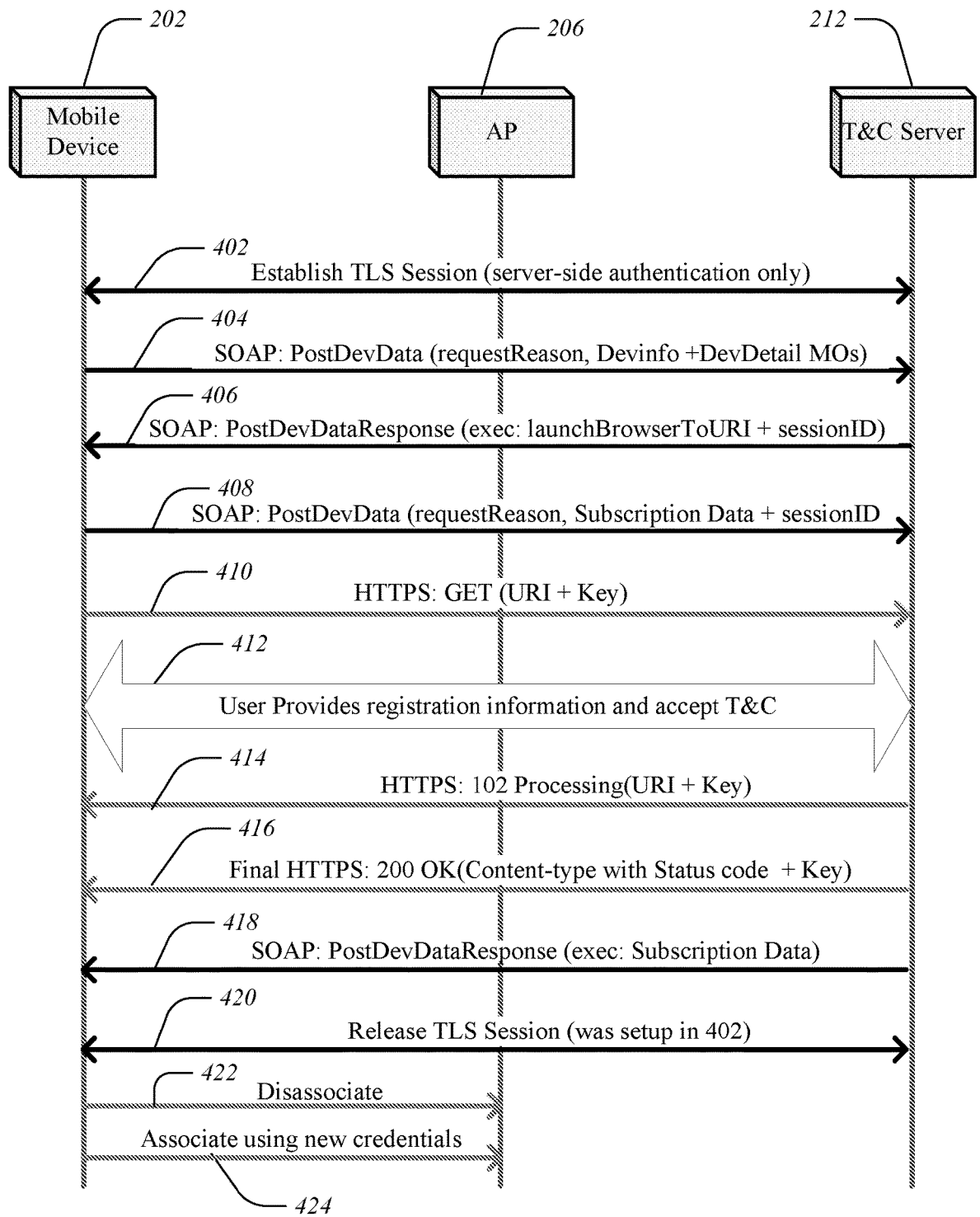
FIG. 4 depicts exemplary operations of an additional embodiment.

FIG. 4 Illustrates a message exchange sequence for provisioning a new T&C and/or a username and password to a mobile device consistent with various embodiments. The following operations describe the end-to-end process of provisioning of new credentials and T&G information or metadata on a mobile device.

In operation 402, a mobile device, such as mobile device 202, initiates a transport layer security (TLS) connection to the T&C Server, such as T&C server 206. In operation 404, the mobile device 202 transmits PostDevData to the T&C server 206, which includes the DevInfo and DevDetail. The value for requestReason is set to "registration" indicating that the mobile device 202 wishes to register for credentials and T&C metadata. The PostDevData SOAP message includes a sessionID. The sessionID is a 128-bit random number generated by the mobile device, such as mobile device 202. The sessionID is used throughout the message sequence as described below to identify messages belonging to the same T&C message exchange.

In operation 406, the T&C Server 206 transmits to the mobile device 202, the PostDevDataResponse SOAP message, including the sessionID value copied from the PostDevData message. The content of the response method informs the mobile device 202 of the next step in the T&C provisioning process. Since the user has signaled for registration, the T&C Server 212 returns a command for the mobile device 202 to launch a browser to the URI supplied in the message. The URI contains the sessionID value copied from operation 404 (e.g., "https://osuserver.example-.com/sign-up/smartphone/index.html&session ID=abcd012210dcba." T&C server 212 uses the session ID to link the HTTP session with T&C SOAP session so that it can provide the subscription data including T&C and user credentials upon successful completion of user input registration processing. If no errors occur, Status is set to "OK", where a Status value of "OK" also indicates that the credential provisioning process is complete. The T&C Server 212 may use the information provided in the DevInfo and DevDetail MOs to identify a mobile device, such as mobile device 202 in future connections and remediation.

In operation 408, the mobile device 202 transmits a PostDevData SOAP message with the content requesting from the T&C server 212 that the subscription data be sent to the mobile device when user input registration is successfully completed at operation 418 below.

In operation 410, the mobile device 202 transmits an Hypertext Transfer Protocol Secure (HTTPS) GET request to the uniform resource identifier(URI) provided in the PostDevDataResponse. In operation 412, the mobile device 202 and T&C server 212 exchange registration and acceptance of T&C information as required by the SP. In operation 414, the T&C server 212 sends processing message to prevent time out of the HTTPS session. If the HTTPS session is left idle for timeout period, the session is terminated and user of mobile device 202 is informed of the session termination. When HTTPS processing is complete, in operation 416 the T&C server 212 sends to mobile device 202 an HTTP 200 "OK" message indicating the end of successful processing.

After successfully processing the user registration input, the T&C 212 creates the subscription data that contains user credentials, if needed, and T&C metadata containing T&C versioning, date. The T&C server 212 also creates specific additional processing information such as instructions for the mobile device 202 to launch web browser and display advertisement page for the FHS provider. In operation 418, the T&C server 212 transmits the subscription provisioning data to the mobile device 202 in a PostDevData Response SOAP message per the request of the mobile device 202 in operation 408. At the end of the exchange of registration data, the mobile device provisions it in the device for future automatic connection to the specified FPH.

In some implementations, an alternative mechanism is used to provide the subscription data to the mobile device 202. One example is the use of the web browser session where, in turn, the connection manager in mobile device 202 may extract subscription data from the HTTPS session. In additional implementations, the T&C server 212 may notify the mobile device 202 that the subscription data is ready and the mobile device 202 should retrieve that the subscription data from the T&C server 212. Other mechanisms may be used to deliver/retrieve the subscription Data. The embodiments are not limited in this context.

In operation 420 the mobile device 202 releases the TLS session it established in operation 402. In operation 422, the mobile device 202 dissociates from the FPH or WiFi access network. In operation 424, the mobile device 202 may then associate to the Wi-Fi access network using the newly established credentials, if available.

Figure 5:
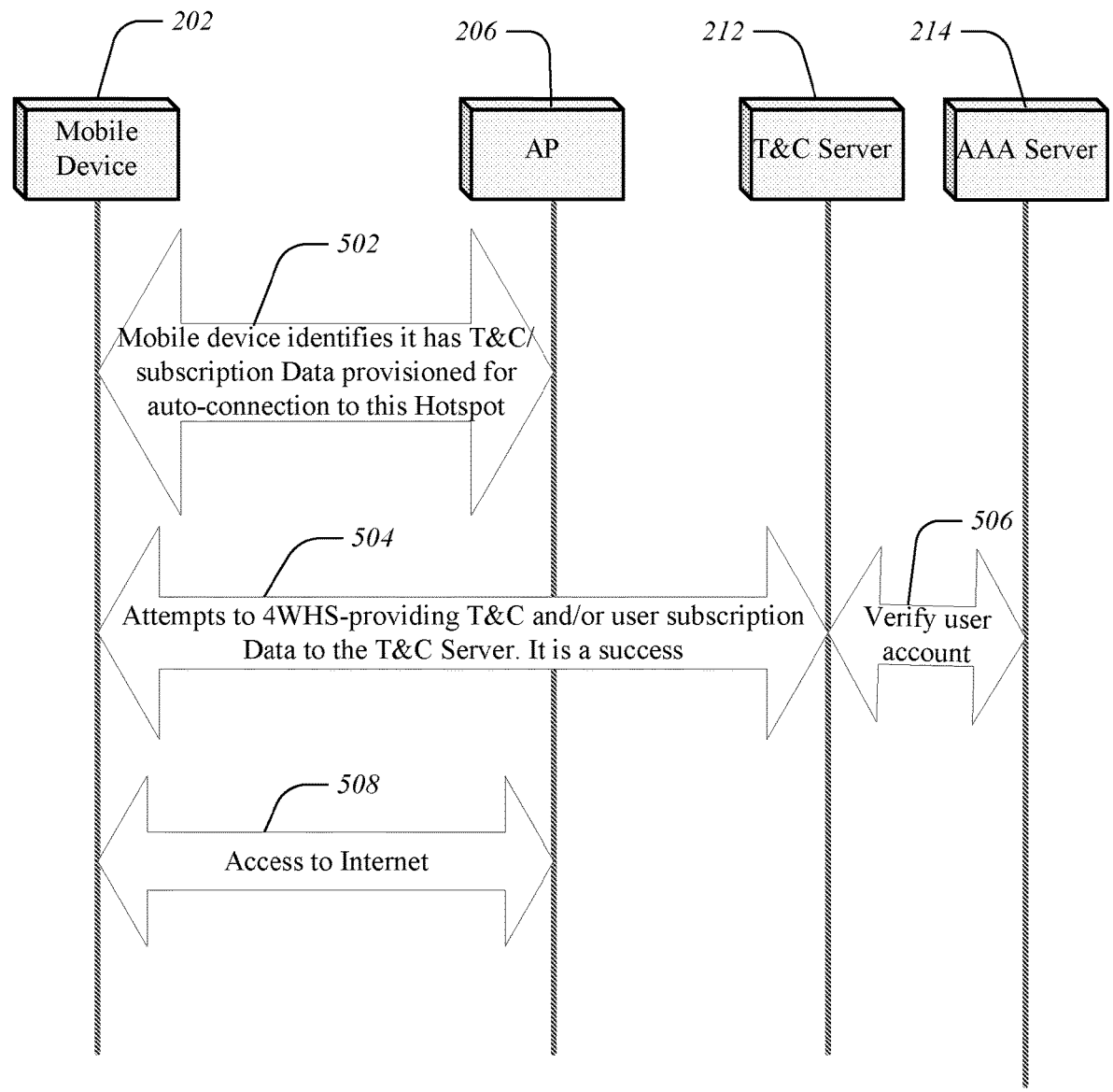
FIG. 5 depicts exemplary operations of a further embodiment.

FIG. 5 illustrates a message exchange sequence for the auto-connection to free public hotspots consistent with the present embodiments. After subscription data which may include the T&C data and/or user (subscription) credentials are provisioned in a mobile device, such as in the examples provided above, at least a portion of the subscription data including T&C data and/or user subscription credentials can be used by the mobile device to automatically connect to the FPH when the user visits the FPH on subsequent occasions. This exchange includes operations 502 to 508, as described below.

Notably, once a mobile device 202 is provisioned with T&C data and/or user subscription credentials for a free public hotspot provider, the mobile device 202 may engage in an auto-connection procedure to connect to the Internet, for example, at any FPH associated with the FPH provider. Thus, provisioning of the T&C data and/or user subscription credentials to a mobile device 202 may take place via an FPH in a first city, while the mobile device launches an auto-connection procedure via a different FPH in a different city on a subsequent occasion using the provisioned T&C data and/or user subscription credentials.

Turning now to FIG. 5, in operation 502, the mobile device 202 identifies a Hotspot 2.0 compliant FPH, such as the access point 206, and further determines that it has auto-connection enabled for this FPH, with T&C and/or user credentials already provisioned.

In operation 504, the mobile device 202 automatically associates with the FPH and starts authentication with 4WHS. The T&C server 212 communicates with the AAA server 214 in operation 506 about the outcome of the authentication process, and also checks if the T&C metadata provided by the mobile device 202 is identical to that stored by the T&C server 212. If so, the authentications and verification succeeds and the mobile device 202 is provided access to the Internet in operation 508.

Upon occasion, a user's subscription for access to a network may be in need of remediation, such as when the T&C information that a user previously agreed to has changed, or when the user credentials for accessing the FPH has expired. The FPH provider may therefore determine based on such factors, as to when it is necessary to perform remediation of user registration and T&C data.

As used herein, the term "remediation" refers broadly to the process of fixing a problem in the user's subscription. The terms "remediation" or "subscription remediation" includes provisioning new credentials to a mobile device, as well as updating the T&C data on a mobile device.

Figure 6:
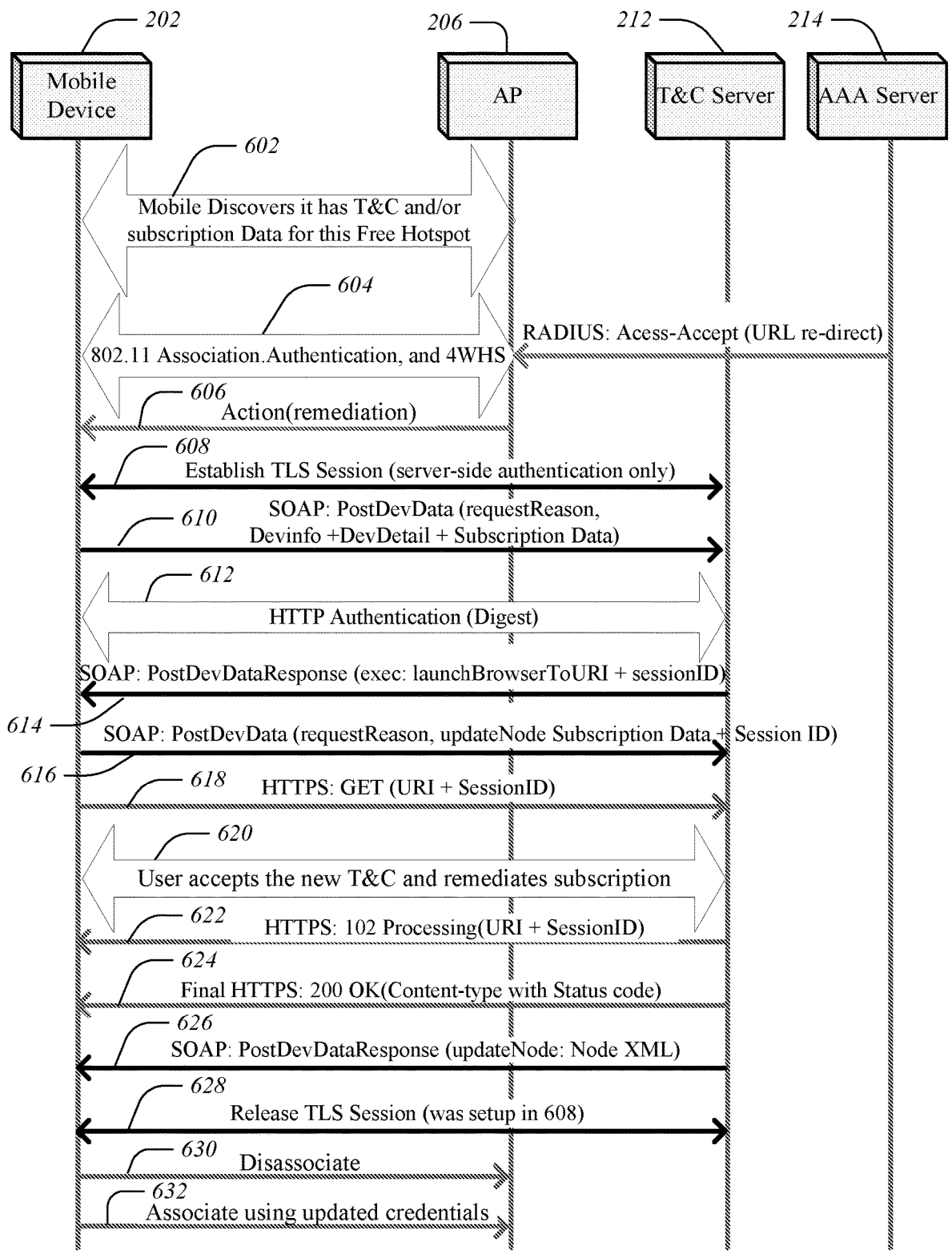
FIG. 6 depicts exemplary operations of another embodiment.

FIG. 6 depicts an embodiment of a message exchange sequence for subscription remediation using SOAP-XML. As shown in FIG. 6, the following operations describe an end-to-end process for remediation of T&C data and, if needed, user credentials on a mobile device.

In operation 602 when a mobile device, such as mobile device 202, communicates with an access point, such as AP 206, the mobile device 202 determines that it has T&C and/or subscription data provisioned previously in the mobile device 202 for an identified FPH to which the AP 202 belongs.

In operation 604 the mobile device 202 attempts to connect to the identified FPH using the provisioned subscription data stored on the mobile device 202. It engages in association and authentication with the FPH.

In operation 606, the FPH provider determines that there is a need for subscription remediation for the mobile device 202. This determination may be based upon a change in T&C since the last time a user of mobile device 202 accepted the T&C, an expiration of user credentials, or other reasons. The T&C server 212 signals the mobile device 202 for initiating the remediation process by sending wireless network manager (WNM) notification or a vendor specific action frame from the AP 206 to the mobile device 202. In other embodiments, notification that remediation is needed may be indicated to a user of the mobile device 202 by other methods.

In operation 608, the mobile device 202 then engages in a subscription remediation message exchange with the T&C server 212. The mobile device 202 initiates a TLS connection to the Subscription T&C entity.

In operation 610, the mobile device 202 transmits PostDevData to the T&C server 206, which includes the DevInfo and DevDetail. The value for requestReason is set to "registration" indicating that the mobile device 202 wishes to register for credentials and T&C metadata. The PostDevData SOAP message includes a sessionID. The sessionID is a 128-bit random number generated by the mobile device, such as mobile device 202. The sessionID is used throughout the message sequence as described below to identify messages belonging to the same T&C message exchange.

In operation 612, the T&C server 212 requests HTTP authentication using the Digest method. The mobile device 202 provides its username and password digest to the T&C server 212. If HTTP authentication is not successful, remediation is not possible and the mobile device 202 aborts the process and informs the user.

In operation 614, the T&C server 212 transmits the PostDevDataResponse SOAP message to the mobile device 202. The content of the response method informs the mobile device 202 to launch a browser to the T&C Server's URI supplied in the message. The URI contains the sessionID value e.g., "https://remediationserver.example.com/signup/smartphone/index. html&sessionID=abcdef0110fedcba.".

In operation 616 the mobile device 202 transmits the PostDevData SOAP message to the T&C server 212, which includes the DevInfo, DevDetail and PerProviderSubscription Data. The mobile device 202 sets the value for requestReason to "Subscription and T&C Data upload."

In operation 618, the mobile device 202 transmits an HTTPS GET request to the URI provided in the PostDevDataResponse.

In operation 620 the mobile device 202 and T&C Server 212 exchange remediation data as required by the SP. According to various embodiments the content of this exchange is implementation specific.

In operation 622 the T&C Server 212 transmits a Keep alive message for the HTTPS session. In operation 624, a message is sent that HTTPS processing has completed successfully.

In operation 626, at the end of the exchange of registration data, the T&C server 212 transmits updated T&C and user subscription data to the mobile device 202. The mobile device 202 may then update the T&C and user subscription data that was previously provisioned for this FPH. For example, the mobile device 202 may delete previous T&C and user subscription data it had stored for the FPH associated with T&C server 212, and may store the updated T&C and user subscription data.

In operation 628 the mobile device 202 releases the TLS session. In operation 630 the mobile device 202 dissociates with the FPH network, and then in operation 632 associates to the FPH network using the updated T&C and credentials, if available.

The present embodiments as outlined in FIG. 6 thus provide an updating for hotspot access established for IEEE 802.11 communications. As noted, in one implementation of the present embodiments, normative text and structures have been submitted and adopted for inclusion in Hotspot 2.0 release 2 specification.

The techniques described herein have been described in the context of IEEE 802.11 networks. However, embodiments are not limited to such networks.

Figure 7:
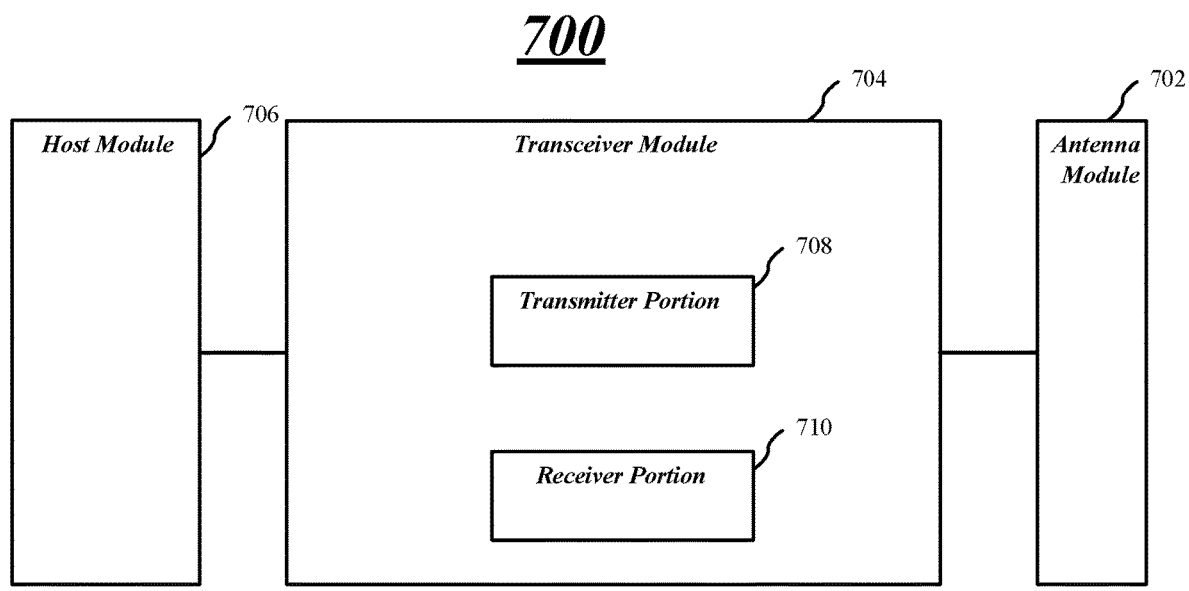
FIG. 7 depicts an embodiment of a wireless device.

FIG. 7 is a diagram of an implementation 700 that may be included in a wireless device, such as a STA, an access point, and/or hotspot. Device 700 may perform techniques, as described herein. As shown in FIG. 7, implementation 700 may include an antenna module 702, a transceiver module 704, and a host module 706. These elements may be implemented in hardware, software, or any combination thereof.

Antenna module 702 provides for the exchange of wireless signals with remote devices. Moreover, antenna module 702 may transmit wireless signals through one or more directional radiation patterns. Thus, antenna module 702 may include multiple antennas and/or multiple radiating elements (e.g., phased-array radiating elements).

Transceiver module 704 provides an interface between antenna module 702 and host module 706. For instance, transmitter portion 708 within transceiver module 704 receives symbols from host module 706 and generates corresponding signals for wireless transmission by antenna module 702. This may involve operations, such as modulation, amplification, and/or filtering. However, other operations may be employed.

Conversely, receiver portion 710 within transceiver module 704 obtains signals received by antenna module 702 and generates corresponding symbols. In turn, receiver portion 710 provides symbols to host module 706. This generation of symbols may involve operations, including (but not limited to) demodulation, amplification, and/or filtering.

The symbols exchanged between host module 706 and transceiver module 704 may form messages or information associated with one or more protocols, and/or one or more user applications. Thus, host module 706 may perform operations corresponding to such protocol(s) and/or user application(s). Such operations may include provisioning and provisioning-related operations, as described herein. Further, exemplary protocols include various media access, network, transport and/or session layer protocols. Exemplary user applications include telephony, messaging, e-mail, web browsing, content (e.g., video and audio) distribution/reception, and so forth.

In addition, host module 706 may exchange control information with transceiver module 704. This control information may pertain to the operation and status of transceiver module 704. For instance, this control information may include directives that host module 706 sends to transceiver module 704. Such directives may establish operating parameters/characteristics for transceiver module 704. Also, this control information may include data (e.g., operational status information) that host module 706 receives from transceiver module 704.

As described above, transmitter portion 708 generates signals from symbols, and receiver portion 710 generates symbols from received signals. To provide such features, transmitter portion 708 and receiver portion 710 may each include various components, such as modulators, demodulators, amplifiers, filters, buffers, upconverters, and/or downconveters. Such components may be implemented in hardware (e.g., electronics), software, or any combination thereof.

Included herein is a set of flow charts representative of exemplary methodologies for performing novel aspects of the disclosed architecture. While, for purposes of simplicity of explanation, the one or more methodologies shown herein, for example, in the form of a flow chart or flow diagram, are shown and described as a series of acts, it is to be understood and appreciated that the methodologies are not limited by the order of acts, as some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all acts illustrated in a methodology may be required for a novel implementation.

Figure 8:
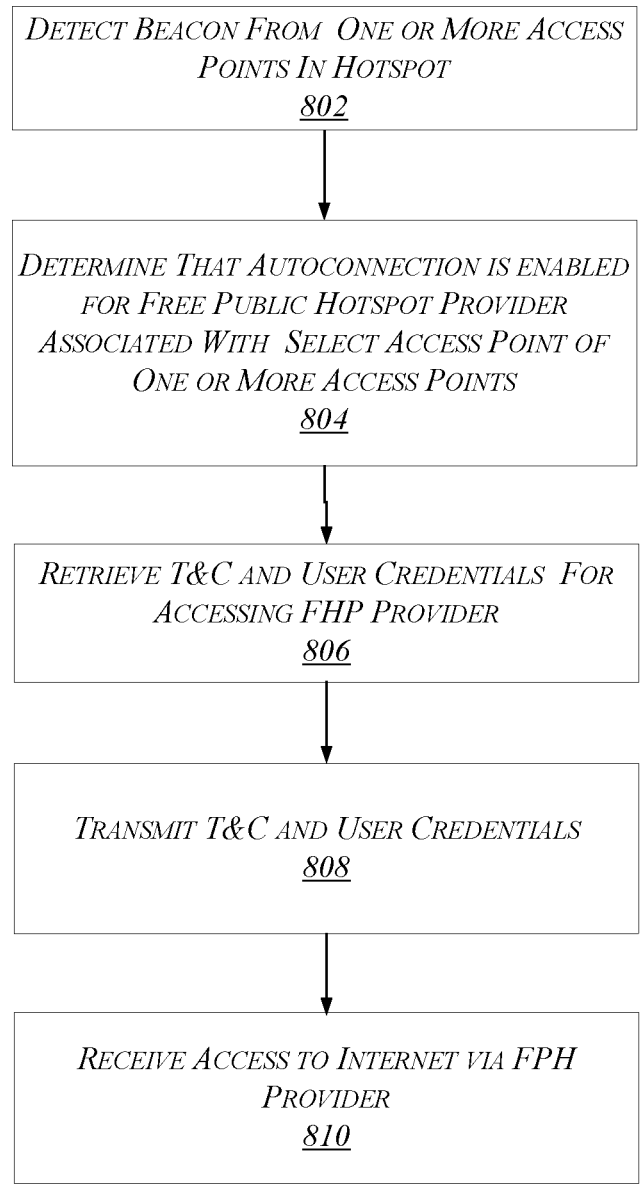
FIG. 8 depicts an exemplary first logic flow.

FIG. 8 illustrates an exemplary first logic flow 800. At block 802, a beacon is detected that is transmitted from each of one or more access points in a hotspot. The beacon may be detected on a mobile device enabled for connecting to WiFi devices. The hotspot may include multiple different access points and may be a free public hotspot that provides network access to users without charge via a WiFi connection.

At block 804 it is determined that auto-connection is enabled for a free public hotspot associated with a select access point of the one or more access points. At block 806 terms and conditions information and user credentials are retrieved for accessing a network provided by the free public hotspot provider (FPH network) associated with the select access point. The terms and conditions information and user credentials may comprise information previously received and stored by the mobile device during a prior occasion in which the mobile device registered with the free public access network.

At block 808, the retrieved terms and conditions information and user credentials are transmitted for reception by the free public hotspot provider. At block 810 access to the Internet is received via the free public hotspot provider.

Figure 9:
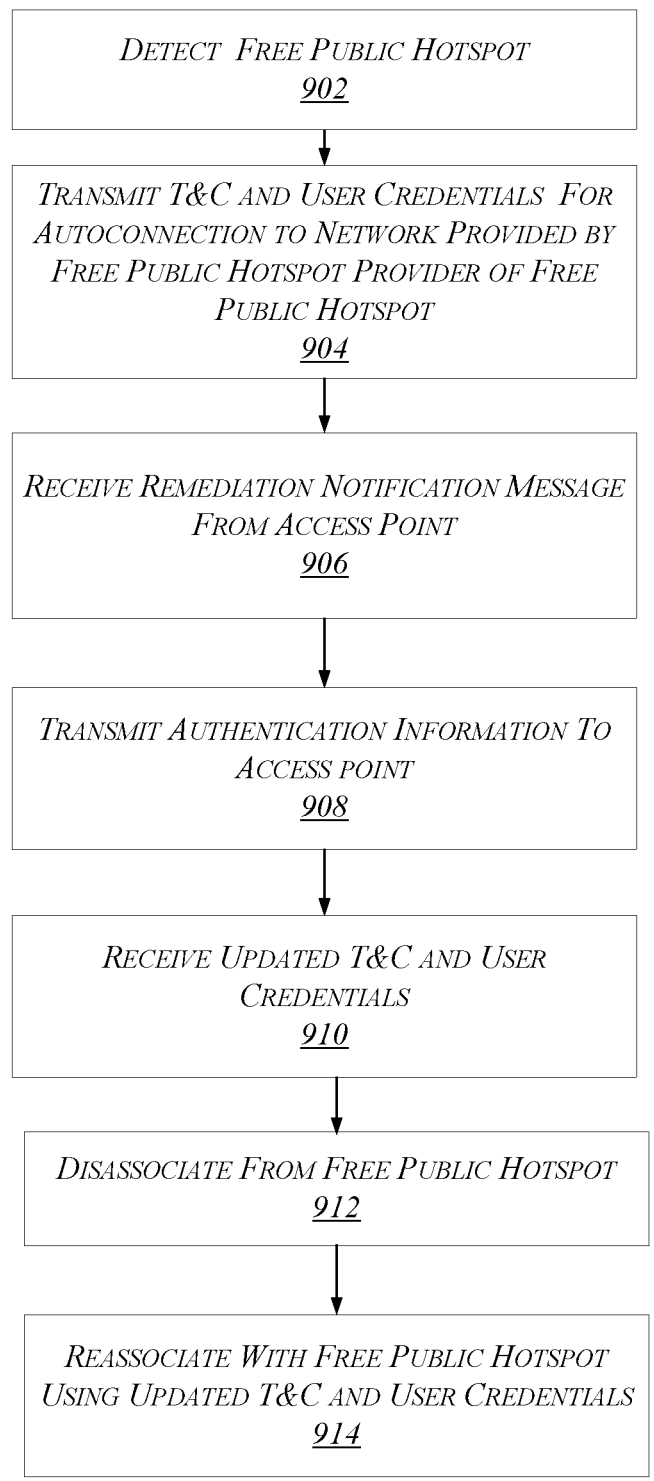
FIG. 9 shows an exemplary second logic flow.

FIG. 9 illustrates an exemplary first logic flow 900. At block 902 a free public hotspot is detected. For example a mobile device may receive a beacon from an access point designating a free public hotspot.

At block 904, terms and conditions and user credentials are transmitted for auto-connection to a network provided by the free public hotspot provider of the free public hotspot. At block 906, a remediation message is received from an access point. The remediation message may indicate that terms and conditions and/or user credentials transmitted to the free public hotspot are out of date or in need of revision.

At block 908, authentication information is transmitted to the access point. The authentication information may in particular identify a mobile device/user that has previously been authenticated to the FPH provider.

At block 910, updated terms and conditions and user credentials are received. The updated terms and conditions and user credentials may be stored in memory on a mobile device to replace previously stored terms and conditions and user credentials.

At block 912, dissociation from the free public hotspot takes place. At block 914 reassociation with the free public hotspot takes place with the updated terms and conditions and user credentials. The reassociation may result in automatic connection to a network such as the Internet that is provided by the FPH.

Figure 10:
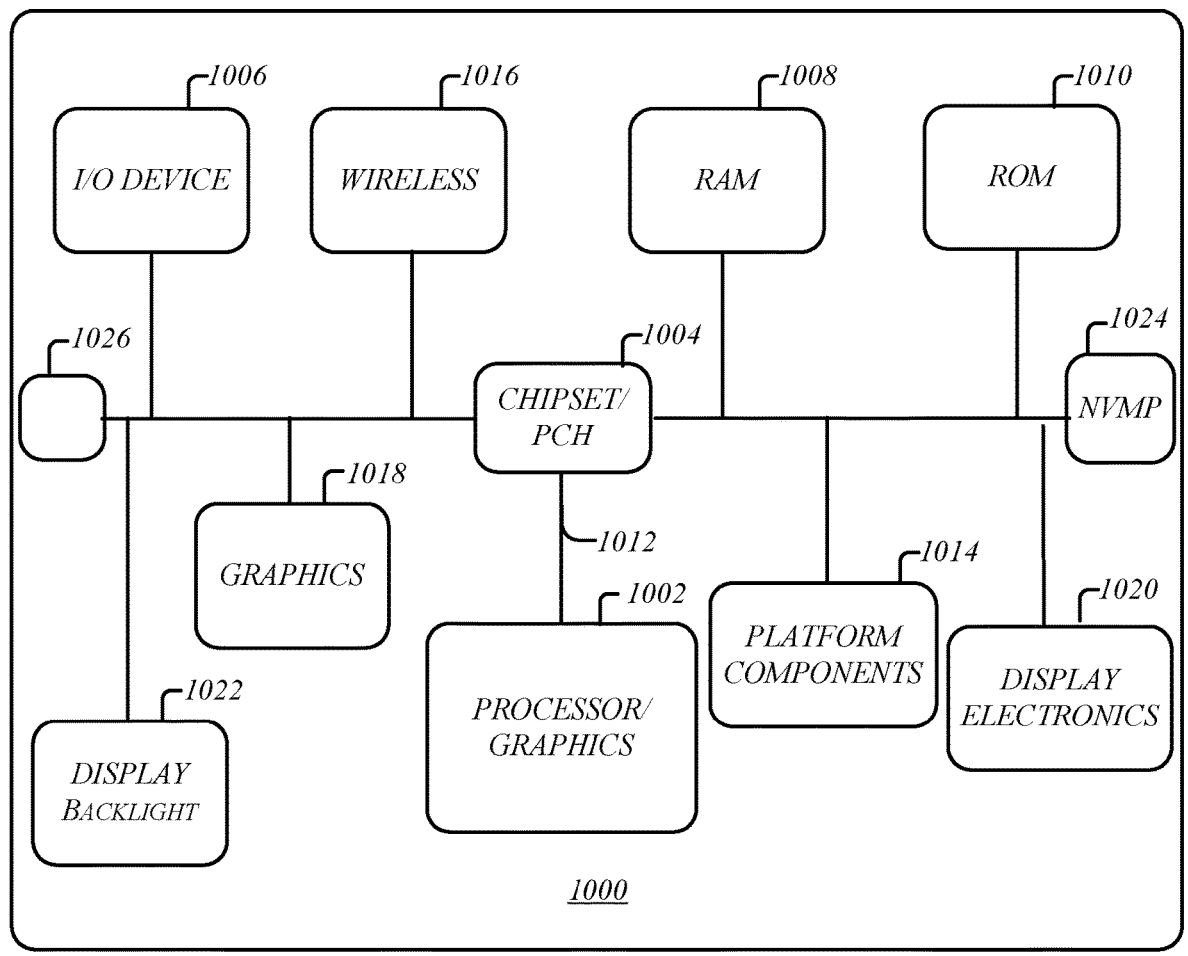
FIG. 10 illustrates an exemplary system architecture.

FIG. 10 is a diagram of an exemplary system embodiment and in particular, FIG. 10 is a diagram showing a platform 1000, which may include various elements. For instance, FIG. 10 shows that platform (system) 1000 may include a processor/graphics core 1002, a chipset/platform control hub (PCH) 1004, an input/output (I/O) device 1006, a random access memory (RAM) (such as dynamic RAM (DRAM)) 1008, and a read only memory (ROM) 1010, display electronics 1020, display backlight 1022, and various other platform components 1014 (e.g., a fan, a crossflow blower, a heat sink, DTM system, cooling system, housing, vents, and so forth). System 1000 may also include wireless communications chip 1016 and graphics device 1018. The embodiments, however, are not limited to these elements.

As shown in FIG. 10, I/O device 1006, RAM 1008, and ROM 1010 are coupled to processor 1002 by way of chipset 1004. Chipset 1004 may be coupled to processor 1002 by a bus 1012. Accordingly, bus 1012 may include multiple lines.

Processor 1002 may be a central processing unit comprising one or more processor cores and may include any number of processors having any number of processor cores. The processor 1002 may include any type of processing unit, such as, for example, CPU, multi-processing unit, a reduced instruction set computer (RISC), a processor that have a pipeline, a complex instruction set computer (CISC), digital signal processor (DSP), and so forth. In some embodiments, processor 1002 may be multiple separate processors located on separate integrated circuit chips. In some embodiments processor 1002 may be a processor having integrated graphics, while in other embodiments processor 1002 may be a graphics core or cores.

The present embodiments as thus provide an updating of architecture and for procedures for accessing free public hotspots. In particular, various embodiments provide implementations of the use scenarios defined in the Marketing Requirements Document for Hotspot 2.0, Version 1.0, Wi-Fi Alliance Hotspot 2.0 Marketing Task Group Mar. 1, 2011 ("HS2.0 MRD [1]"), as excerpted below.

2.5.11 Use Case: Connecting to a Public, Free Hotspot 2.5.11.1 Description

Stacy is waiting at the local airport where only a free hotspot service is available, and she wants check her email before taking off. She turns on her notebook. The mobile device identifies a free public hotspot. The hotspot requires the user to accept the usage terms and conditions. Stacy uses the airport quite often and connects to the same hotspot every time she's at the airport. Stacy has previously accepted the terms and conditions of the hotspot so that when she comes back to the hotspot or a hotspot operated by the same provider, her mobile device is capable of identifying that the previously accepted terms and conditions apply. Her mobile device connects to the hotspot without requiring Stacy's manual intervention. Stacy accesses her email.

2.5.11.2 Background

The intent of the use case is to focus on the ease of establishing a network connection by eliminating launching a web browser to present the terms and conditions to the user. When a user comes to a hotspot for the first time, the terms and conditions could be presented to the user for acceptance. Once the user accepts the terms and conditions, the mobile device will automatically handle the term and conditions page and establish the connection automatically when the user comes to the same hotspot in the future.

In some regulatory domains, SPs of free hotspots which provide internet access must know the user's identity. The EAP identity provides the user identity in these HS 2.0 networks.

The applicable mobile device states for this use case are Discovery and Access.

2.5.11.3 Sequence of Events

The following is the sequence of events for this use case:

1. The user walks into a free public hotspot for the first time.

2. The user may manually select the free hotspot or the connection manager can autonomously select the free hotspot.
3. An application on the mobile device is launched to display the terms and conditions of hotspot usage, if required.
4. The user accepts the terms and conditions.
5. The user starts using the internet.
6. The user walks into a free public hotspot for the second or subsequent time.
7. The mobile device automatically connects to that hotspot. 4
8. The mobile device automatically determines that the terms and conditions have not changed and the user starts using the internet.

4.3.9 Requirements for Use Case: Connecting to a Public, Free Hotspot

Use case 2.5.11 adds the following requirements:
1. The free public hotspot shall advertise its network type as—free‖.
2. The hotspot shall provide information defining the steps the mobile device shall perform to establish a connection.
3. The hotspot shall support automatic handling of—terms and conditions‖(this may include, for example, the user entering an email address). When the mobile device and the network have determined that the terms and conditions have not changed since the mobile device's previous acceptance, the mobile device shall automatically establish service.
4. The mobile device shall be able to identify that the hotspot offers free service.
5. The mobile device shall be able to identify and perform the next steps to establish the connection to the free public hotspot. 5
6. Upon acceptance of terms and conditions, the network authorizes the mobile device for access to services.

In one implementation of the present embodiments, normative text and structures have been submitted and adopted for inclusion in section 5.5 of the Hotspot 2.0 standard as excerpted below.

5.5 Hotspot Procedures for Free Public Hotspots

The HS2.0 MRD [1] includes a "Connecting to a public, free hotspot" use case with corresponding requirements (see 2.5.11 and 4.3.9 in [1]). Hotspot operators can provide Hotspot 2.0 based free public hotspot service using OSU, subscription and AAA server functions. The requirements of this use case are met using the mechanisms and protocols defined in this specification.

1. The user in a Free Public Hotspot initiates the online-signup registration process with the Free Public Hotspot's OSU server.
2. During the registration state protocol exchange, the OSU server presents the terms and conditions to the user.
3. If the user accepts the terms and conditions, the OSU server issues a credential; if the user refuses, no credential is provisioned.
4. When the user/mobile device returns to the same Free Public Hotspot, the previously provisioned credentials are used to provide secure, automatic access.
5. If the terms and conditions change, then the user is taken though a subscription remediation process during which the new terms and conditions are presented. If the user accepts the changed terms and conditions, then a new credential is provisioned.

The following examples pertain to further embodiments.

In example 1, an apparatus to manage network access includes a memory to store subscription data for access to a network, the subscription data including at least terms and conditions information for the network, circuitry linked to the memory, and a connection connection component for execution on the circuitry to identify an access point connected to the network and automatically forward at least a portion of the subscription data to the identified access point in an association message.

In example 2, the apparatus of example 1 may include a radio component linked to the circuitry to receive a radio beacon that provides identifier information for the identified access point.

In example 3, the connection component of any of the examples 1-2 may be for execution on the circuitry to retrieve terms and conditions data or user credentials for access to the network from the memory for forwarding in the association message.

In example 4, the connection component of any of the examples 1-3 may be for execution on the circuitry to enable automatic association with one or more free public hotspots connected to the network using the terms and conditions data or user credentials in response to user input.

In example 5, the connection component of any of the examples 1-4 may be for execution on the circuitry to generate a query for enabling automatic association.

In example 6, the connection component of any of the examples 1-5 may be for execution on the circuitry to automatically schedule for transmission the stored subscription data for a specific network when communications are established with the access point.

In example 7, the connection component of any of the examples 1-6 may be for execution on the circuitry to perform secure authentication automatically with the network using the stored subscription data.

In example 8, the connection component of any of the examples 1-7 may be for execution on the circuitry to perform automatic subscription remediation of subscription data for access to the network when a notification message for remediation is received.

In example 9, the connection component of any of the examples 1-8 may be for execution on the circuitry to forward username and password information to authenticate to the network for automatically updating the subscription data.

In example 10, the connection component of any of the examples 1-9 may be for execution on the circuitry to delete from the memory a first set of terms and conditions information or a first set of user credentials, and store a second set of terms and conditions information or a second set of user credentials received during the automatic update of subscription data.

In example 11, the connection component of any of the examples 1-10 may be for execution on the circuitry to send instructions for launching a web browser to display provider information associated with the identified access point.

In example 12, at least one computer-readable storage medium comprises instructions that, when executed, cause a system to identify an access point connected to a network that provides subscription data for access to the network, the subscription data including at least terms and conditions information for the network, and automatically forward in an association message at least a portion of the subscription data for transmission to the access point.

In example 13, the at least one computer-readable storage medium of example 12 may include instructions that, when executed, cause a system to retrieve terms and conditions data or user credentials for access to the network from the memory for forwarding in the association message In example 14, the at least one computer-readable storage medium of any of examples 12-13 may include instructions that, when executed, cause a system to: retrieve terms and conditions data or user credentials for access to the network from the memory for forwarding in the association message.

In example 15, the at least one computer-readable storage medium of any of examples 12-14 may include instructions that, when executed, cause a system to enable automatic association with one or more free public hotspots connected to the network using the terms and conditions data or user credentials in response to user input.

In example 16, the at least one computer-readable storage medium of any of examples 12-15 may include instructions that, when executed, cause a system to automatically schedule for transmission the stored subscription data for a specific network when communications are established with the identified access point.

In example 17, the at least one computer-readable storage medium of any of examples 12-16 may include instructions that, when executed, cause a system to perform secure authentication automatically with the network using the stored subscription data.

In example 18, the at least one computer-readable storage medium of any of examples 12-17 may include instructions that, when executed, cause a system to perform automatic subscription remediation of subscription data for access to the network when a notification message for remediation is received.

In example 19, the at least one computer-readable storage medium of any of examples 12-18 may include, comprising instructions that, when executed, cause a system to send instructions for launching a web browser to display provider information associated with the identified access point.

In example 20, a computer implemented method includes identifying an access point connected to a network that provides subscription data for access to the network, the subscription data including at least terms and conditions information for the network; and automatically forwarding in an association message at least a portion of the subscription data for transmission to the access point.

In example 21, the computer implemented method of example 20 may include retrieving terms and conditions data or user credentials for access to the network from the memory for forwarding in the association message.

In example 22 the computer implemented method of any of examples 20-21 may include enabling automatic association with one or more free public hotspots connected to the network using the terms and conditions data or user credentials in response to user input.

In example 23 the computer implemented method of any of examples 20-22 may include automatically scheduling for transmission the stored subscription data for a specific network when communications are established with the identified access point.

In example 23 the computer implemented method of any of examples 20-22 may include performing automatic subscription remediation of subscription data for access to the network when a notification message for remediation is received.

In example 24 the computer implemented method of any of examples 20-23 may include sending instructions for launching a web browser to display provider information associated with the identified access point.

In example 25, an apparatus to manage network access comprises means to perform the method of any one of the examples 20-24.

In example 26, user equipment to manage network access comprises means to perform the method of any of the examples 20-24.

In example 27, a wireless device includes a memory to store subscription data for access to a network, the subscription data including at least terms and conditions information for the network, circuitry linked to the memory; a radio component to receive a radio beacon that provides information that identifies an access point; and a connection component for execution on the circuitry to identify an access point connected to the network and automatically forward at least a portion of the subscription data to the identified access point in an association message.

In example 28, the connection component of example 27 may be for execution on the circuitry to retrieve terms and conditions data or user credentials for access to the network from the memory for forwarding in the association message.

In example 29, the connection component of any of examples 27-28 may be for execution on the circuitry to enable automatic association with one or more free public hotspots connected to the network using the terms and conditions data or user credentials in response to user input.

In example 30, the connection component of any of examples 27-29 may be for execution on the circuitry to generate a query on the wireless device for enabling automatic association.

In example 31, the connection component of any of examples 27-30 may be for, the connection component for execution on the circuitry to automatically schedule for transmission over the radio component of the stored subscription data for a specific network when communications are established with the access point.

In example 32, the connection component of any of examples 27-31 may be for execution on the circuitry to perform secure authentication automatically with the network using the stored subscription data.

In example 33, the connection component of any of examples 27-32 may be for execution on the circuitry to perform automatic subscription remediation of subscription data for access to the network when a notification message for remediation is received.

In example 34, the connection component of any of examples 27-33 may be for execution on the circuitry to forward username and password information to authenticate to the network for automatically updating the subscription data.

In example 35, the connection component of any of examples 27-34 may be for execution on the circuitry to delete from the memory a first set of terms and conditions information or a first set of user credentials, and store a second set of terms and conditions information or a second set of user credentials received during the automatic update of subscription data.

In example 36, the wireless device of any of examples 27-35 may include a memory controller to direct read and write operations to the memory, an interface to exchange data with the identified access point and a display to present the subscription data.

The embodiments, as previously described, may be implemented using various hardware elements, software elements, or a combination of both. Examples of hardware elements may include devices, logic devices, components, processors, microprocessors, circuits, processor circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

In some embodiments, an element is defined as a specific structure performing one or more operations. It may be appreciated, however, that any element defined as a specific structure performing a specific function may be expressed as a means or step for performing the specified function without the recital of structure, material, or acts in support thereof, and such means or step is meant to cover the corresponding structure, material, or acts described in the detailed description and equivalents thereof. The embodiments are not limited in this context.

Some embodiments may be described using the expression "one embodiment" or "an embodiment" along with their derivatives. These terms mean that a particular feature, structure, or characteristic described in connection with the embodiment is included in at least one embodiment. The appearances of the phrase "in one embodiment" in various places in the specification are not necessarily all referring to the same embodiment. Further, some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims.

What is claimed is:

1. An apparatus, comprising:
   circuitry coupled with memory operative to store instructions, the circuitry, when executing the instructions, to cause a mobile device to:
   send a request to remediate credentials for a subscription for access to a network;
   process, by the mobile device, a response to the request received by the mobile device, the response including a command and a session identifier, the command to cause the mobile device to launch a browser to a location identified by a uniform resource identifier (URI), wherein the URI includes the session identifier, wherein the session identifier comprises a 128-bit random number to identify a sequence of messages between the mobile device and a server;
   receive, with the session identifier, subscription information including Terms and Conditions (T&Cs) and the credentials from the server, the T&Cs different from a T&C previously agreed to by a user associated with the credentials, the mobile device to receive an update for a management object (MO) from the server, the update comprising the credentials in response to a successful authentication with the server;
   store the credentials received in the subscription information; and
   automatically transmit the credentials to an access point upon a new association to access the network.

2. The apparatus of claim 1, wherein the request is a PostDevData Simple Object Access Protocol (SOAP) message including a value set for requestReason.

3. The apparatus of claim 2, the PostDevData SOAP message comprising a Devinfo management object (MO) and a DevDetail MO, the Devinfo and the DevDetail MOs including information to identify the apparatus.

4. The apparatus of claim 1, wherein the response is a PostDevDataResponse Simple Object Access Protocol (SOAP) message and the command is launchBrowserToURI.

5. The apparatus of claim 4, the PostDevDataResponse SOAP message comprising a sessionID comprising the URI to identify the location.

6. The apparatus of claim 1, wherein the credentials comprise a new password to connect with the network.

7. The apparatus of claim 1, the circuitry to send the request, process the response, and exchange the subscription information via a transport layer security (TLS) connection between the apparatus and the server.

8. The apparatus of claim 7, the circuitry to release the TLS connection upon completion of the exchange of the subscription information.

9. The apparatus of claim 1, comprising a radio component coupled with the circuitry, the radio component to send and receive information and data with the server.

10. The apparatus of claim 1, wherein the circuitry and the memory are comprised in a connection component.

11. A computer implemented method to manage network access, comprising:
    causing a mobile device to send a request to remediate credentials for a subscription for access to a network;
    processing, by the mobile device, a response to the request received by the mobile device, the response including a command and a session identifier, the command to cause the mobile device to launch a browser to a location identified by a uniform resource identifier (URI), wherein the URI includes the session identifier, wherein the session identifier comprises a 128-bit random number to identify a sequence of messages between the mobile device and a server;

cause the mobile device to receive, with the session identifier, subscription information including Terms and Conditions (T&Cs) and the credentials from the server, the T&Cs different from a T&C previously agreed to by a user associated with the credentials, the mobile device to receive an update for a management object (MO) from the server, the update comprising the credentials in response to a successful authentication with the server;

cause the mobile device to store the credentials received in the subscription information; and cause the mobile device to automatically transmit the credentials to an access point upon a new association to access the network.

12. The computer-implemented method of claim 11, wherein the request is a PostDevData Simple Object Access Protocol (SOAP) message including a value set to registration is requestReason.

13. The computer-implemented method of claim 12, the PostDevData SOAP message comprising a Devinfo management object (MO) and a DevDetail MO, the Devinfo and the DevDetail MOs including information to identify the mobile device.

14. The computer-implemented method of claim 11, wherein the response is a PostDevDataResponse Simple Object Access Protocol (SOAP) message and the command is launchBrowserToURI.

15. The computer-implemented method of claim 14, the PostDevDataResponse SOAP message comprising a sessionID comprising the URI to identify the location.

16. The computer-implemented method of claim 11, wherein the credentials comprise a username and a password to connect with the network.

17. The computer-implemented method of claim 11, comprising sending the request, processing the response, and exchanging the subscription information via a transport layer security (TLS) connection between the mobile device and the server.

18. The computer-implemented method of claim 17, comprising releasing the TLS connection upon completion of the exchanging of the subscription information.

19. At least one non-transitory machine-readable storage medium comprising instructions that when executed by circuitry, cause the circuitry of a mobile device to:

send a request to remediate credentials for a subscription for access to a network;

process a response to the request received by the mobile device, the response including a command and a session identifier, the command to cause the mobile device to launch a browser to a location identified by a uniform resource identifier (URI), wherein the URI includes the session identifier, wherein the session identifier comprises a 128-bit random number to identify a sequence of messages between the mobile device and a server;

receive, with the session identifier, subscription information including Terms and Conditions (T&Cs) and the credentials from the server, the T&Cs different from a T&C previously agreed to by a user associated with the credentials, the mobile device to receive an update for a management object (MO) from the server, the update comprising the credentials in response to a successful authentication with the server;

store the credentials received in the subscription information; and automatically transmit the credentials to an access point upon a new association to access the network.

20. The at least one non-transitory machine-readable storage medium of claim 19, wherein the request is a PostDevData Simple Object Access Protocol (SOAP) message including a value set to registration is requestReason.

21. The at least one non-transitory machine-readable storage medium of claim 20, the PostDevData SOAP message comprising a Devinfo management object (MO) and a DevDetail MO, the Devinfo and the DevDetail MOs including information to identify a device.

22. The at least one non-transitory machine-readable storage medium of claim 19, wherein the response is a PostDevDataResponse Simple Object Access Protocol (SOAP) message and the command is launchBrowserToURI.

23. The at least one non-transitory machine-readable storage medium of claim 22, the PostDevDataResponse SOAP message comprising a sessionID comprising the URI to identify the location.

24. The at least one non-transitory machine-readable storage medium of claim 19, comprising instructions that when executed by the circuitry, cause the circuitry to send the request, process the response, and exchange the subscription information via a transport layer security (TLS) connection between a mobile device and the server.

25. The at least one non-transitory machine-readable storage medium of claim 24, comprising instructions that when executed by the circuitry, cause the circuitry to release the TLS connection upon completion of the exchange of the subscription information.

* * * * *